United States Patent [19]

McIntyre

[11] Patent Number: 5,754,903
[45] Date of Patent: May 19, 1998

[54] MOTORIZED FILM LOADING METHOD

[75] Inventor: Dale F. McIntyre, Honeoye Falls, N.Y.

[73] Assignee: Eastman Kodak Company, Rochester, N.Y.

[21] Appl. No.: 757,053

[22] Filed: Nov. 26, 1996

[51] Int. Cl.$^6$ .................................................. G03B 1/18
[52] U.S. Cl. .................... 396/387; 396/397; 396/538
[58] Field of Search ........................... 396/387, 395–398,
396/403, 404, 406, 409, 411, 535, 536,
538, 439, 440

[56] References Cited

U.S. PATENT DOCUMENTS

| | | | |
|---|---|---|---|
| 3,463,071 | 8/1969 | Winkler et al. | 95/31 |
| 4,397,535 | 8/1983 | Harvey | 354/212 |
| 4,474,443 | 10/1984 | Komatsuzaki et al. | 354/212 |
| 5,220,371 | 6/1993 | Tanii et al. | 354/212 |
| 5,255,034 | 10/1993 | Shimada et al. | 354/173 |
| 5,412,446 | 5/1995 | Rydelek | 354/212 |
| 5,456,419 | 10/1995 | Ezawa | 242/356 |
| 5,630,189 | 5/1997 | Siekierski et al. | 396/440 |

*Primary Examiner*—Safet Metjahic
*Assistant Examiner*—J. K. Han
*Attorney, Agent, or Firm*—Roger A. Fields

[57] ABSTRACT

A film loading method for a camera comprising the steps of opening a door to uncover a chamber for a film cartridge, inserting a film leader which protrudes from the film cartridge through a film ingress slot in the chamber and into engagement with a film advance sprocket in a film threading path, and rotating the film advance sprocket in engagement with the film leader to advance the engaged leader along the film threading path, is characterized in that the film leader is inserted manually through the film ingress slot into engagement with the film advance sprocket before the film cartridge is received completely in the cartridge receiving chamber or before the door is closed. This allows one to pull the film leader out of engagement with the film advance sprocket from the film ingress slot to abort the film loading operation.

8 Claims, 4 Drawing Sheets

MOTORIZED FILM LOADING METHOD

FIELD OF THE INVENTION

The invention relates generally to the field of photography, and in particular to a camera with a motorized film loading feature and to a film loading method for the camera.

BACKGROUND OF THE INVENTION

Prior art U.S. Pat. No. 5,255,034 issued Oct. 19, 1993 discloses a camera comprising a chamber for receiving a film cartridge, path defining means forming a confined film threading path provided with a film ingress slot from the chamber to the film threading path, a motorized film advance sprocket located in the film threading path proximate the film ingress slot for engaging a film leader protruding from the film cartridge and inserted through the film ingress slot into the film threading path and for advancing the engaged leader along the film threading path, a door which is opened to uncover the chamber to permit the film cartridge to be placed in the chamber, a cartridge detection switch for determining the film cartridge has been fully seated in the chamber, a leader detection switch for determining the film leader has been inserted through the film ingress slot to the film advance sprocket, and a door-locked detection switch for determining that the door has been closed and locked. The film loading operation involves manually seating the film cartridge in the chamber and closing and locking the door. Then, the film cartridge is motor-rotated within the chamber to automatically insert the film leader through the film ingress slot and into engagement with the rotating sprocket. If the leader detection switch is not closed within a certain time, which indicates the film leader was prevented from reaching the rotating sprocket due to some abnormality, the film loading operation is aborted.

SUMMARY OF THE INVENTION

According to one aspect of the invention a film loading method for a camera comprising the steps of opening a door to uncover a chamber for a film cartridge, inserting a film leader which protrudes from the film cartridge through a film ingress slot in the chamber and into engagement with a film advance sprocket in a film threading path, and rotating the film advance sprocket in engagement with the film leader to advance the engaged leader along the film threading path, is characterized in that:

the film advance sprocket is rotated in engagement with the film leader when the door is open.

According to another aspect of the invention a film loading method for a camera comprising the steps of inserting a film leader which protrudes from a film cartridge through a film ingress slot in a cartridge receiving chamber and into engagement with a film advance sprocket in a film threading path, and rotating the film advance sprocket in engagement with the film leader to advance the engaged leader along the film threading path, is characterized in that:

the film leader is inserted manually through the film ingress slot into engagement with the film advance sprocket before the film cartridge is received completely in the cartridge receiving chamber.

Preferably, in both instances, a film tension-responsive slip clutch is coupled with the film advance sprocket to allow one to pull the film leader out of engagement with the film advance sprocket from the film ingress slot in order to remove the film cartridge from the vicinity of the chamber before the film cartridge has been fully seated in the chamber or the door is closed.

DETAILED DESCRIPTION OF THE INVENTION

The invention is disclosed as being embodied preferably in a motorized camera such as disclosed in prior art U.S. Pat. No. 5,255,034. Because many of the features of a motorized camera are generally known, the description which follows is directed in particular only to those elements forming part of or cooperating directly with the disclosed embodiment. It is to be understood, however, that other elements may take various forms known to a person of ordinary skill in the art.

Figure 1:
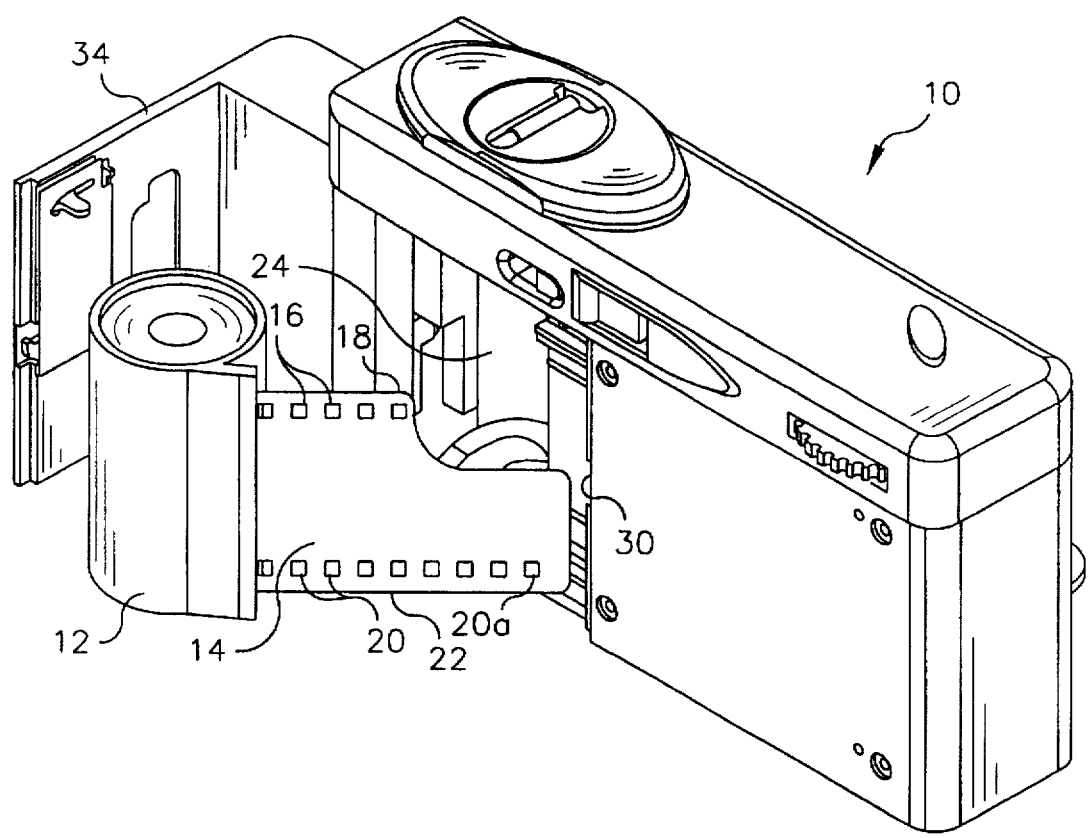
FIG. 1 is a rear perspective view of a camera with a motorized film loading feature pursuant to a preferred embodiment of the invention.

Referring now to the drawings, FIG. 1 shows a motorized camera 10 intended to be used with a conventional 35 mm film cartridge 12 having an originally partially-protruding film leader 14. The film leader 14 has a series of perforations 16 inwardly adjacent a longitudinal film edge 18 and a series of perforations 20 inwardly adjacent a longitudinal film edge 22.

Figure 2:
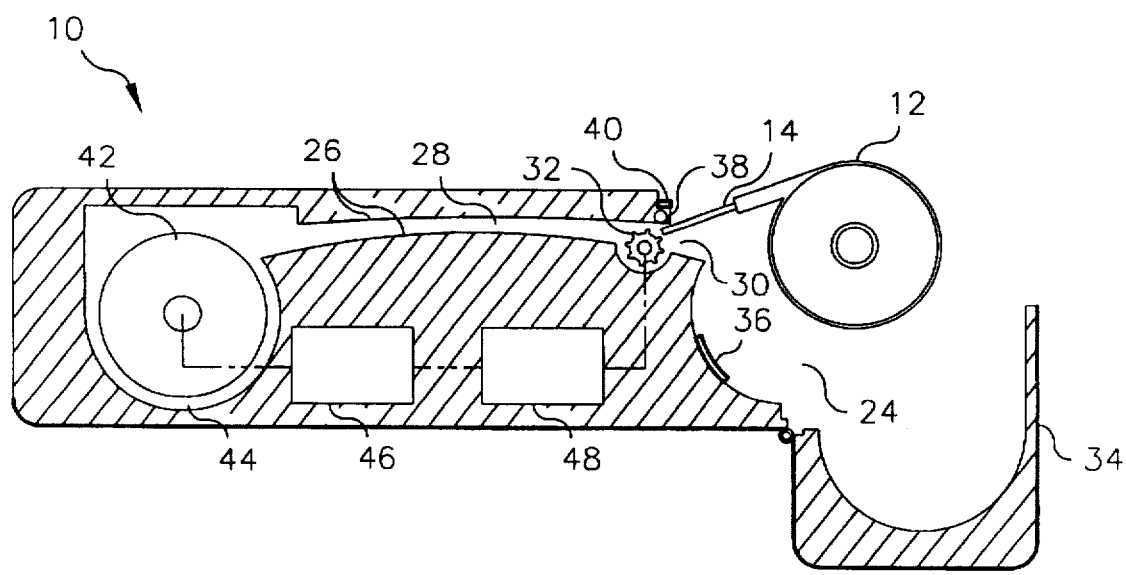
FIG. 2 is a plan sectional view of the camera.
Figure 3:
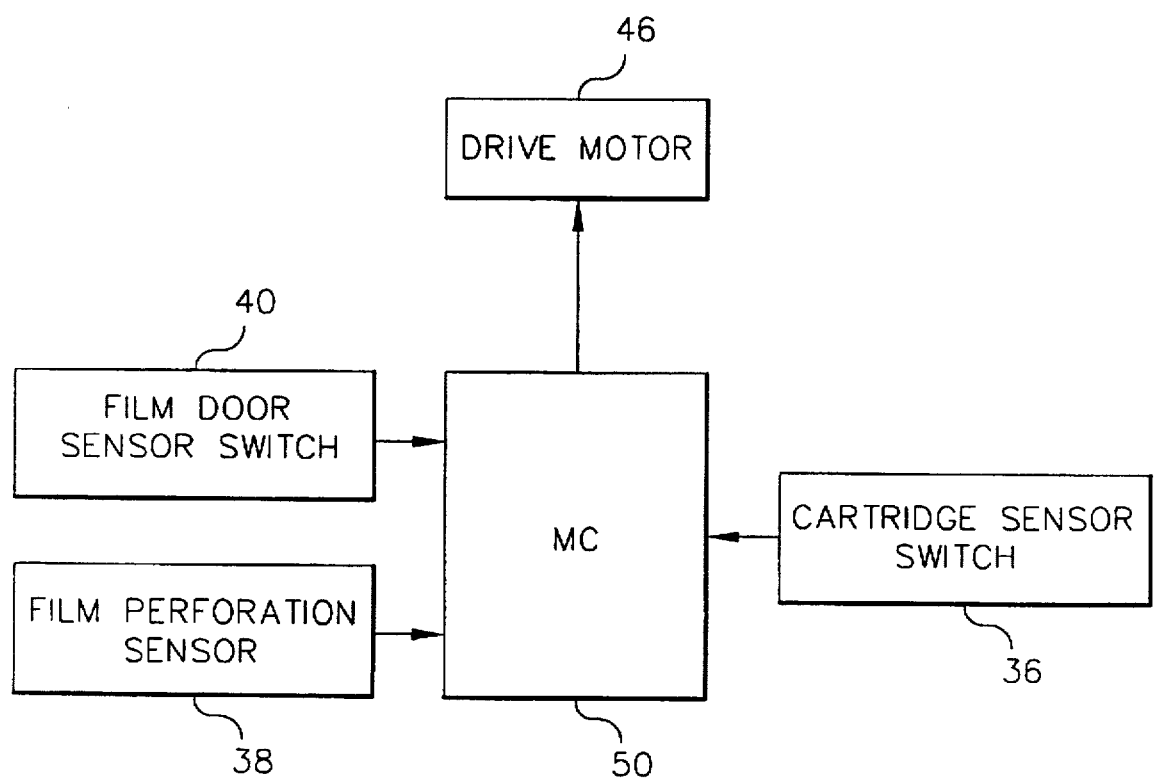
FIG. 3 is a schematic block diagram of certain part of the camera used to effect a motorized film loading operation.

As shown in FIGS. 1 and 2, the camera 10 comprises a rearwardly opening chamber 24 for laterally receiving the film cartridge 12, path defining means 26 forming a confined film threading path 28 provided with a film ingress slot 30 from the chamber to the film threading path, a known-type rotatable film advance sprocket 32 located in the film threading path proximate the film ingress slot for engaging the successive film perforations 20 beginning with a first one 20a when the protruding film leader 14 is manually inserted through the film ingress slot into the film threading path and for advancing the engaged leader along the film threading path, a pivotable rear film door 34 which is pivoted open to uncover the chamber to permit the film cartridge to be placed in the chamber and is pivoted closed to light-tightly seal the chamber with the film cartridge fully seated in the chamber, a known-type cartridge sensor or detection switch 36 for determining the film cartridge has been fully seated in the chamber, a known-type film perforation sensor 38 for sensing the successive film perforations 20 beginning with the first one 20a to determine the film leader has been inserted through the film ingress slot to the film advance sprocket, and a known-type film door sensor switch 40 for determining the rear film door has been closed to light-tightly seal the chamber. A known-type self-cinching film take-up spool 42 is located in a closed chamber 44. See FIG. 2. A known-type drive motor 46 is directly coupled with the film take-up spool 42 and is coupled via a known-type bi-directional film tension-responsive slip clutch 48 to the film advance sprocket 32. A known-type microcomputer 50 is connected with the cartridge sensor switch 36, the film perforation sensor 38, the film door sensor switch 40, and the drive motor 46. See FIG. 3. The microcomputer has a conventional built-in counter, not shown, for maintaining a count of the successive film perforations 20 beginning with the first one 20a, which is derived from the film perforation sensor 38.

OPERATION-PREFERRED EMBODIMENT (FIG. 4)

As indicated in FIGS. 1 and 2, the rear film door 34 is opened and the film cartridge 12 is positioned in the vicinity of the chamber 24 to manually insert the protruding film leader 14 through the film ingress slot 30 to the film advance sprocket 32. Then, the film cartridge 12 is fully seated in the chamber 24. The rear film door 34 is left open.

If (1) the film door sensor switch 40 is open, because the rear film door 34 is open, (2) the film perforation sensor 38 detects the first film perforation 20a to make the counter have a perforation count equal to one, because the film leader 14 is inserted through the film ingress slot 30 to the film advance sprocket 32, and (3) the cartridge sensor switch 36 is closed, because the film cartridge 12 is fully seated in the chamber 24, the microcomputer 50 energizes the drive motor 50 in a forward rotation mode to concurrently rotate the film advance sprocket and the film take-up spool 42. The film advance sprocket 32 is rotated in engagement with the successive film perforations 20 beginning with the first one 20a to advance the engaged leader 14 along the film threading path 28 to the film take-up spool 42. At this time, the film perforation sensor 38 will have detected twelve perforations, i.e. approximately one and one-half frame lengths of the film leader 14, to make the counter have a perforation count equal to twelve. When the counter has a perforation count equal to twelve, the microcomputer 50 de-energizes the drive motor 46 to discontinue rotation of the film advance sprocket 32 and the film take-up spool 42, and it resets the counter to zero. See FIG. 4.

The bi-directional film tension-responsive slip clutch 48 makes it possible for one to pull the film leader 14 out of engagement with the film advance sprocket 32, from the film ingress slot 30, without tearing the film leader at any of its successive film perforations 20, in order to cancel the film loading operation before the rear film door 34 is closed.

Figure 4:
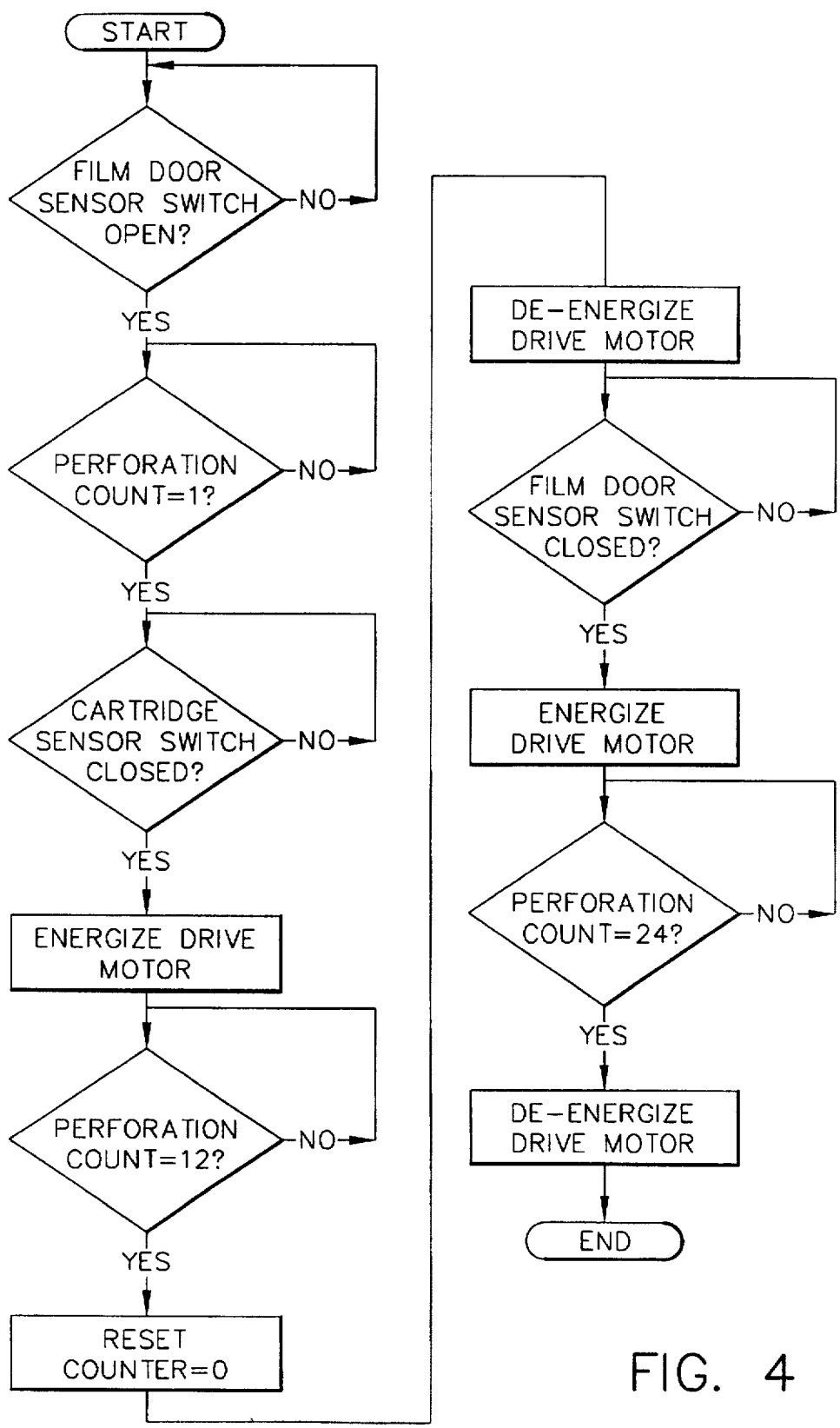
FIG. 4 is a flow chart depicting the motorized film loading operation.

When, on the other hand, as indicated in FIG. 4, the rear film door 34 is closed to, in turn, close the film door sensor switch 40, the microcomputer 50 again energizes the drive motor 46 to concurrently rotate the film advance sprocket 32 and the film take-up spool 42. This permits the film take-up spool 42 to start to take up the film leader 14. When the film perforation sensor 38 has detected twenty-four perforations, i.e. approximately three frame lengths of the film leader 14, to make the counter have a perforation count equal to twenty-four, the film take-up spool has taken up three frame lengths of the film leader, and the microcomputer 50 again de-energizes the drive motor 46 to discontinue rotation of the film advance sprocket 32 and the film take-up spool 42. The drive motor 46 rotates the film advance sprocket 32 much slower than it rotates the film take-up spool 42. Thus, as the film take-up spool 42 takes up the film leader 14 the bi-directional film tension-responsive slip clutch 48 allows the film advance sprocket to be over-driven due to the resulting film tension in order to avoid tearing the film leader at any of its successive film perforations 20.

OPERATION-ALTERNATE EMBODIMENT (FIG. 5)

In this instance, the rear film door 34 is opened and the film cartridge 12 is positioned in the vicinity of the chamber 24 to manually insert the protruding film leader 14 through the film ingress slot 30 to the film advance sprocket 32. The film cartridge 12 is not seated in the chamber 24 as in the preferred embodiment. The rear film door 34 is left open.

If (1) the film door sensor switch 40 is open, because the rear film door 34 is open, and (2) the film perforation sensor 38 detects the first film perforation 20a to make the counter have a perforation count equal to one, because the film leader 14 is inserted through the film ingress slot 30 to the film advance sprocket 32, the microcomputer 50 energizes the drive motor 50 in a forward rotation mode to concurrently rotate the film advance sprocket and the film take-up spool 42. The film advance sprocket 32 is rotated in engagement with the successive film perforations 20 beginning with the first one 20a to advance the engaged leader 14 along the film threading path 28 to the film take-up spool 42. At this time, the film perforation sensor 38 will have detected twelve perforations, i.e. approximately one and one-half frame lengths of the film leader 14, to make the counter have a perforation count equal to twelve. When the counter has a perforation count equal to twelve, the microcomputer 50 de-energizes the drive motor 46 to discontinue rotation of the film advance sprocket 32 and the film take-up spool 42, and it resets the counter to zero. See FIG. 5.

The bi-directional film tension-responsive slip clutch 48 makes it possible for one to pull the film leader 14 out of engagement with the film advance sprocket 32, from the film ingress slot 30, without tearing the film leader at any of its successive film perforations 20, in order to cancel the film loading operation before the film cartridge 12 is fully seated in the chamber 24 and the rear film door 34 is closed.

Figure 5:
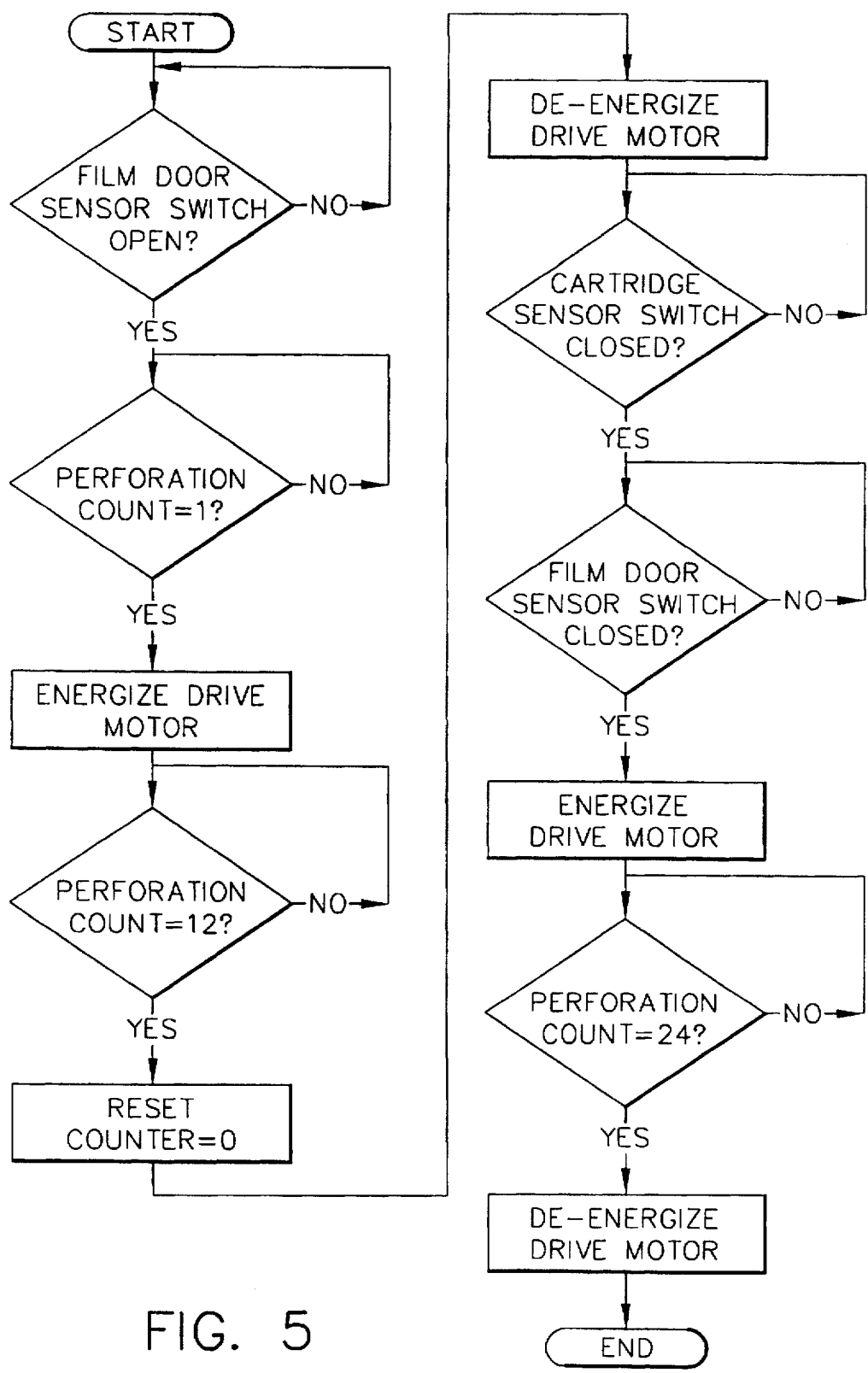
FIG. 5 is a flow chart depicting an alternate version of the motorized film loading operation.

When, on the other hand, as indicated in FIG. 5, the film cartridge 12 is fully seated in the chamber 24 to, in turn, close the cartridge sensor switch 36 and the rear film door 34 is closed to, in turn, close the film door sensor switch 40, the microcomputer 50 again energizes the drive motor 46 to concurrently rotate the film advance sprocket 32 and the film take-up spool 42. This permits the film take-up spool 42 to start to take up the film leader 14. When the film perforation sensor 38 has detected twenty-four perforations, i.e. approximately three frame lengths of the film leader 14, to make the counter have a perforation count equal to twenty-four, the film take-up spool has taken up three frame lengths of the film leader, and the microcomputer 50 again de-energizes the drive motor 46 to discontinue rotation of the film advance sprocket 32 and the film take-up spool 42. The drive motor 46 rotates the film advance sprocket 32 much slower than it rotates the film take-up spool 42. Thus, as the film take-up spool 42 takes up the film leader 14 the bi-directional film tension-responsive slip clutch 48 allows the film advance sprocket to be over-driven due to the resulting film tension in order to avoid tearing the film leader at any of its successive film perforations 20.

The invention has been described with reference to preferred and alternate embodiments. However, it will be appreciated that variations and modifications can be effected by a person of ordinary skill in the art without departing from the scope of the invention.

PARTS LIST 10. motorized camera
12. film cartridge
14. film leader
16. film perforations
18. longitudinal film edge
20. film perforations
20a. first perforation
22. longitudinal film edge 24. chamber
26. path defining means
28. film threading path
30. film ingress slot
32. film advance sprocket
34. film door
36. cartridge sensor switch
38. film perforation sensor
40. film door sensor switch
42. film take-up spool
44. chamber
46. drive motor
48. bi-directional tension-responsive slip clutch
50. microcomputer

What is claimed is:

1. A camera comprising a chamber for receiving a film cartridge, path defining means forming a confined film threading path provided with a film ingress slot from said chamber to said film threading path, motorized film advance means located in said film threading path proximate said film ingress slot for engaging a film leader protruding from the film cartridge and inserted through the film ingress slot into the film threading path and for advancing the engaged leader along the film threading path, a door which is opened to uncover said chamber to permit the film cartridge to be placed in the chamber, cartridge detection means for determining the film cartridge has been placed in said chamber, and leader detection means for determining the film leader has been inserted through said film ingress slot to said film advance means, is characterized by:

means for determining said door is open; and control means connected to said film advance means, said cartridge detection means, said leader detection means, and said means for determining said door is open, for activating the film advance means to advance the film leader along said film threading path when the film cartridge has been placed in said chamber and the film leader has been inserted though said film ingress slot to the film advance means, but the door is open.

2. A camera as recited in claim 1, wherein said film threading path extends between said chamber for the film cartridge and a motorized film take-up to permit said film advance means to advance the film leader along the film threading path to said film take-up, and said control means deactivates said film advance means when the film leader has been advanced along said film threading path to said film take-up and reactivates the film take-up when said door is closed in order to advance the film leader onto the film take-up.

3. A camera comprising a chamber for receiving a film cartridge, path defining means forming a confined film threading path provided with a film ingress slot from said chamber to said film threading path, motorized film advance means located in said film threading path proximate said film ingress slot for engaging a film leader protruding from the film cartridge and inserted through the film ingress slot into the film threading path and for advancing the engaged leader along the film threading path, cartridge detection means for determining the film cartridge has been fully seated in said chamber, and leader detection means for determining the film leader has been inserted through said film ingress slot to said film advance means, is characterized by:

control means connected to said film advance means, said cartridge detection means, and said leader detection means, for activating the film advance means to advance the film leader along said film threading path when the film leader has been inserted though said film ingress slot to the film advance means, but the film cartridge has not been fully seated in said chamber.

4. A camera as recited in claim 3, wherein a film tension-responsive slip clutch is coupled with said film advance means to allow one to pull the film leader out of engagement with the film advance means from said film ingress slot in order to remove the film cartridge from said chamber before the film cartridge has been fully seated in the chamber.

5. A film loading method for a camera comprising the steps of opening a door to uncover a chamber for a film cartridge, inserting a film leader which protrudes from the film cartridge through a film ingress slot in the chamber and into engagement with a film advance sprocket in a film threading path, and rotating the film advance sprocket in engagement with the film leader to advance the engaged leader along the film threading path, is characterized in that:

the film advance sprocket is rotated in engagement with the film leader when the door is open.

6. A film loading method as recited in claim 5, wherein rotation of the film advance means in engagement the film leader is discontinued when the engaged leader is advanced to a film take-up and is recontinued when the door is closed in order to advance the engaged leader onto the film take-up.

7. A film loading method as recited in claim 5, wherein the film leader is inserted manually through the film ingress slot into engagement with the film advance sprocket before the film cartridge is completely in the chamber.

8. A film loading method for a camera comprising the steps of inserting a film leader which protrudes from a film cartridge through a film ingress slot in a cartridge receiving chamber and into engagement with a film advance sprocket in a film threading path, and rotating the film advance sprocket in engagement with the film leader to advance the engaged leader along the film threading path, is characterized in that:

the film leader is inserted manually through the film ingress slot into engagement with the film advance sprocket before the film cartridge is received completely in the cartridge receiving chamber.

* * * * *